United States Patent Office 2,862,981
Patented Dec. 2, 1958

2,862,981

PREPARATION OF METHYLENIC COMPOUNDS

Joseph P. Bain and Robert L. Webb, Jacksonville, Fla., assignors to The Glidden Company, Cleveland, Ohio, a corporation of Ohio No Drawing. Application August 27, 1953
Serial No. 376,999

7 Claims. (Cl. 260—666)

The present invention relates to the preparation of compounds possessing a terminal methylene group and to certain new compounds resulting therefrom.

Terminal methylene groups are very reactive and for this reason many such compounds find extensive use as intermediates and as raw materials in the manufacture of synthetic resins. Among such raw materials may be mentioned styrene, divinyl benzene, acrylic acid derivatives, vinyl chloride, vinyl acetate, allyl alcohols, etc. Methods of producing such methylenic compounds from readily available raw materials are therefore very desirable.

It is accordingly an object of the present invention to produce compounds containing a terminal methylene group.

Another object is to provide a novel method for producing methylenic compounds.

An additional object is to provide certain new compounds containing a terminal methylene group.

Other objects will be apparent from the following description.

It has been found that when monocyclic, ethylol substituted olefines are heated, formaldehyde is split off with the formation of a terminal methylenic compound. The reaction can be illustrated by the following general equation:

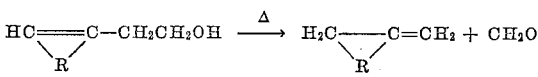

wherein R is a divalent radical forming the rest of a monocarbocyclic ring.

In our work we have employed such compounds as are derivable from nopol, which is the condensation product of β-pinene with anhydrous formaldehyde, J. A. C. S. 68, 638 (1946). Thus, upon heating the monocyclic isomer of nopol, 1,8-p-menthadiene-7-carbinol, see U. S. Patent 2,340,294, at reflux, there is produced 1(7),8-p-menthadiene. Similarly, heating 1-p-menthene-7-carbinol yields 1(7)-p-menthene. In the same manner, the pyronene type carbinols produced by the recyclization of the allo-ocimene-carbinol of Patent 2,453,110, and corresponding to the monocyclic compounds of Parker and Goldblatt, J. A. C. S. 72, 2151 (1950), which possess the structure

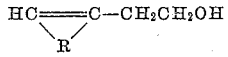

yield compounds of the structure

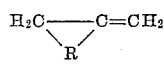

wherein R is a divalent radical forming the rest of a carbon ring.

Under mild isomerization conditions, 1(7),8-p-menthadiene is readily isomerized to dipentene, and this conversion can also be accomplished by heating the 1,8-p-menthadiene-7-carbinol with an acid isomerization catalyst. Since these conditions also readily cause isomerization of nopol to the monocyclic compound, nopol itself can be used. Rosin is a suitable catalyst for the reaction. Under more severe conditions, the more stable isomers are formed, such as α and γ-terpinene, 2,4(8)-p-menthadiene, as well as cymene.

The following examples are illustrative.

Example 1.—1(7),8-p-menthadiene

To a flask equipped with a short Claisen-type distilling head, there was added 680 grams 1,8-p-menthadiene-7-carbinol. Upon heating to boiling, initially about 265°, the carbinol slowly decomposed with appearance of solid paraformaldehyde. The rate of heating was maintained so that the temperature of the distilling material remained at about 170° to 180° throughout the slow decomposition. There was required a total of about 30 hours of heating which was conducted intermittently over a period of four days. At the end of this time there remained in the pyrolysis flask only 89 grams of a resinous material which solidified on cooling. The paraformaldehyde was filtered from the distillate. The crude product weighed 493 grams (88% of theory) and contained only traces of starting material and other impurities. It was fractionated at 10:1 reflux at 100 mm. pressure through a 30 x 1 inch Stedman column to provide pure 1(7), 8-p-menthadiene as fractions possessing almost constant physical properties including infrared spectra, B. P. 105° at 100 mm., $n_D^{25}$ 1.4714 and $d_4^{27}$ 0.8301.

All fractions had an absorption peak at 232 mμ and the maximum extinction coefficient $$\alpha = E_{1\,cm.}^{g./l.}$$

of the fractions in iso-octane varied from about 2 to 0.3 without noticeable variation in the infrared spectra of the samples. The material absorbing in the ultraviolet was therefore an impurity and probably did not exceed about one percent in the better fractions.

Bromine titration showed the presence of two double bonds but a crystalline bromide could not be obtained.

Hydrogenation of 1(7),8-p-menthadiene with platinum oxide catalyst at room temperature and 20 to 40 pounds' pressure yielded a mixture shown by infrared analysis to consist of approximately 50% unchanged 1(7),8-p-menthadiene, 25% cis-p-menthane and 25% trans-p-menthane when only enough hydrogen was absorbed to correspond to one double bond. When 1(7),8-p-menthadiene was fully saturated with hydrogen, the product was a mixture of cis- and trans-p-menthanes in about equal parts. The hydrogen required for complete saturation was 2.0 moles per mole of 1(7),8-p-menthadiene.

Example 2.—Isomerization of 1(7),8-p-menthadiene (A) A mixture of 75% by weight gum rosin and 25% of 1(7),8-p-menthadiene was heated at reflux, about 195–205°, for nine hours. The volatile oil was then steam distilled and infrared analysis showed it to consist of 54% 1,8-p-menthadiene, remainder unchanged starting material.

(B) When 5 ml. of 1(7),8-menthadiene was heated at reflux with 0.05 gram 30/60 mesh fuller's earth, there was obtained a mixture which was shown by infrared analysis to consist of 20% cymene, 5% dipentene, 2% 2,4(8)-menthadiene, 2 to 4% α-terpinene, 2 to 4% γ-terpinene and traces of other products. There was, in addition, a considerable amount of polymer.

(C) Conversion of nopol to 1,8-p-menthadiene was accomplished by heating a mixture of 350 grams gum rosin and 166 grams nopol at 250–260° for 4 hours. The volatile oil obtained on steam distillation weighed 77 grams, and infrared analysis showed that it consisted of 80% 1,8-p-menthadiene and 20% alcohols. The resinous nonvolatile residue possessed a softening point of 79° (ball and ring method) and acid number 123.

Example 3.—1(7)-p-menthene

1(7)-p-menthene was obtained on heating 74 grams of carvomenthene-7-carbinol prepared by partial hydrogenation of 1(7),8-p-menthadiene-7-carbinol in accordance with the teaching of the Bain et al. application Serial No. 279,260, filed March 28, 1952, at atmospheric pressure and 245–314° for about eight hours a day for ten days and employing the same type of equipment as for the preparation in Example 1. The decomposition was considerably slower than in Example 1. Aside from paraformaldehyde, there was obtained as distillate 27 grams (44% of theory) of crude 1(7)-p-menthene of 90% or higher purity. It was purified by fractionation, the purest fraction as judged by infrared analysis boiling at 174° at 760 mm. pressure, and showed $n_D^{25}$ 1.4575, $d_4^{25}$ 0.8212. Bromine titration showed the presence of one double bond, but a crystalline bromide could not be obtained. Examination of the infrared spectrum shows the product to contain the characteristic $CH_2=C<$ absorptions at about 6.1 and 11.3μ, but of only about one-half the optical density of those possessed by 1(7),8-p-menthadiene.

Isomerization of 1(7)-p-menthene was accomplished by heating about one ml. of the hydrocarbon with about 10 milligrams of 30/60 mesh fuller's earth at reflux for 30 minutes.

Infrared analysis of the filtered, isomerized sample showed it to contain 80% 1-p-menthene and 20% 1(7)-p-menthene.

Example 4.—1,1,2-trimethyl-3-methylene-cyclohexenes

Nopyl acetate was heated for three hours at about 250° C. The product was then fractionated at 10 mm. pressure to separate the pyrolysis products, among them the acetates of α-pyronene carbinol (A) and β-pyronene carbinol (B):

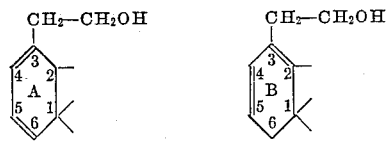

A fraction of the acetate of α-pyronene carbinol, B. P. 121°, $n_D^{25}$ 1.4760, $$\alpha(E_{1\,cm.}^{\xi \Lambda.})=29.2$$

$\lambda_{max}$264, was saponified to the free alcohol, 1,1,2-trimethyl-3-β-hydroxy ethyl-3,5-cyclohexadiene, α-pyronene carbinol.

Twelve grams of the α-pyronene carbinol was heated for 17 hours at reflux temperature, 225–245° C., at atmospheric pressure, in a small distilling flask equipped with a Claisen head. The carbinol decomposed slowly, producing formaldehyde and a hydrocarbon. The rate of heating was maintained so that the distilling material remained at 160–180° C. throughout the decomposition. The distillate obtained was washed with 50% NaOH at 80° C. to remove formaldehyde. 4.7 grams of washed hydrocarbon was obtained, 17.8% of theory. The washed hydrocarbons had the following physical properties: B. P. 165–175° C., $N_D^{25}$ 1.4705.

The structure of the hydrocarbon produced by thermal decomposition of α-pyronene carbinol is indicated by its ultraviolet and infrared spectra. Its infrared spectra indicates the presence of a single terminal methylene group by measurement of the optical density of the absorption bands characteristic of this group at 6.1 and 11.3μ, and the presence of a symmetrically disubstituted ethylenic band by absorptions at 13.5–14.5μ. The ultraviolet spectrum of the hydrocarbon had an absorption peak at 232 mμ and an extinction coefficient $$\alpha=E_{1\,cm.}^{\xi \Lambda.}$$

of 44. The position of the absorption peak in the ultraviolet spectrum corresponds with the predicted $\lambda_{max}$ for 1,1,2-trimethyl-3-methylene-4-cyclohexene, compound C. However, a much higher extinction coefficient than 44 would be expected if the thermal decomposition product of α-pyronene carbinol was solely 1,1,2-trimethyl-3-methylene-4-cyclohexene. Most isomers having the same type of conjugate system have about the same extinction coefficient. Thus, the expected extinction coefficient for 1,1,2-trimethyl-3-methylene-4-cyclohexene would be of the same magnitude as β-phellandrene, whose extinction coefficient $$E_{1\,cm.}^{\xi \Lambda.}$$

at $\lambda_{max}$232 mμ, is about 150.

The optical densities of the terminal methylene and disubstituted ethylenic bands in the infrared spectrum indicate that the total distillate is made up of compounds having both groups. The position of the terminal methylene group must be the same as the ethanol group in α-pyronene carbinol. Thus the remaining double bond must be between carbon atoms 5 and 6 in the cyclohexene ring to satisfy the conditions of being a disubstituted ethylenic band which is not conjugate to the terminal methylene. This non-conjugate pyronene-type compound is therefore compound D.

The residue in the pyrolysis flask (5.1 grams) was analyzed by infrared and ultraviolet spectroanalysis and found to be polymeric material containing about 5% β-pyronene carbinol (B). The presence of β-pyronene carbinol in the residue when none was present in the starting α-pyronene carbinol indicates that thermal decomposition of α-pyronene carbinol proceeds as follows:

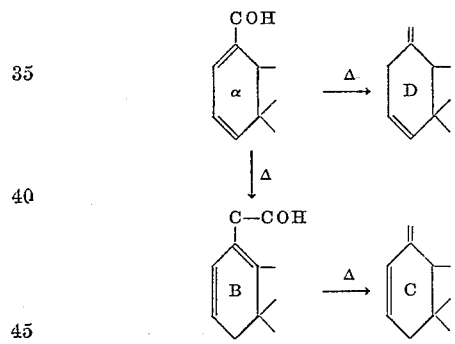

Therefore, compound D is the pyrolysis product from the α-pyronene carbinol and compound C results from isomerization of α-pyronene carbinol followed by pyrolysis of the so-formed β-pyronene carbinol.

Example 5.—Treatment of β-pyronene carbinol

A sample of β-pyronene carbinol, B. P. about 115° C. at 10 mm., and produced by careful fractionation of the product resulting from pyrolysis of nopol at 240° C. for 10 hours, was heated at about 250 to 260° C. for several days while permitting formaldehyde and hydrocarbon to codistill. The distillate was treated with excess hot 10% caustic soda to destroy the formaldehyde. The partially purified hydrocarbon showed $\lambda_{max}$ 232 mμ and α=118. No compound D was detected.

It is thus seen that while all of the compounds treated are $C_{11}$ compounds derived from nopol, the particular location and size of the substituents on the ring are not material. The invention is therefore applicable to the treatment of any primary alcohol possessing the structure

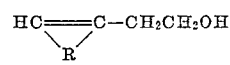

wherein R is a divalent radical. However, since β-pinene is present in substantial quantities in American turpentine, the invention is of particular value in the production of monocyclic isomers thereof possessing a terminal methylene group attached to the ring.

Having described the invention, what is claimed is:

1. The process which consists of heating a monocyclic compound of the structural formula

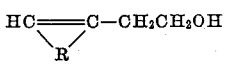

wherein R is a divalent radical forming the rest of a carbocyclic ring, under non-acidic conditions for a prolonged time at a temperature above 225° C. whereby formaldehyde is split off and there is formed a compound of the structural formula

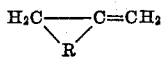

2. The process of claim 1 in which the starting compound is an isomer of nopol possessing a 6-membered carboxylic ring.

3. The process of claim 1 in which the starting compound is a 1,1,2-trimethyl-3-β-hydroxyethyl-conjugated cyclohexadiene in which one of the double bonds involves the number 3 carbon atom.

4. The process of claim 3 in which the starting material is 1,1,2-trimethyl-3-β-hydroxyethyl-3-5-cyclohexadiene.

5. The process of claim 3 in which the starting material is 1,1,2-trimethyl-3-β-hydroxyethyl-2,4-cyclohexadiene.

6. The process which comprises heating 1,8-p-menthadiene-7-carbinol for a time and at a temperature sufficient to split off formaldehyde and form 1(7),8-p-menthadiene.

7. The process which comprises heating carvomenthene-7-carbinol for a time and at a temperature sufficient to split off formaldehyde and form 1(7)-p-menthene.

References Cited in the file of this patent

UNITED STATES PATENTS

| | | |
|---|---|---|
| 2,340,294 | Bain | Feb. 1, 1944 |
| 2,537,638 | Kitchen | Jan. 9, 1951 |

OTHER REFERENCES

Chemical Abstracts, vol. 28, pages 2343[9] (1934).

Whitmore: Organic Chemistry, eighth printing (1944), I. Van Nostrand Co., 250 4th Ave., New York, N. Y., pages 648–9.

Bain: J. Am. Chem. Soc., vol. 68, (1946), pages 638–641.